United States Patent [19]

Lee

[11] 3,740,481

[45] June 19, 1973

[54] SENSE LINE COUPLING STRUCTURES CIRCUITS FOR MAGNETIC MEMORY DEVICE

[75] Inventor: Shi Kyu Lee, Kent, Wash.

[73] Assignee: The Boeing Company, Seattle, Wash.

[22] Filed: Sept. 29, 1971

[21] Appl. No.: 184,919

Related U.S. Application Data

[62] Division of Ser. No. 855,227, Dec. 15, 1969.

[52] U.S. Cl. ............ 179/15 BL, 179/15 A, 340/183

[51] Int. Cl. ............ H04j 3/04

[58] Field of Search ............ 179/15 A, 15 BL; 340/183

[56] References Cited

UNITED STATES PATENTS

| | | | |
|---|---|---|---|
| 3,059,228 | 10/1962 | Beck | 179/15 BL |
| 3,199,043 | 8/1965 | Hinrichs | 179/15 BL |
| 3,213,290 | 10/1965 | Klein | 179/15 BL |
| 3,639,693 | 2/1972 | Bartlett | 179/15 A |
| 3,665,108 | 5/1972 | Bowers | 179/15 BL |
| 3,059,228 | 10/1962 | Beck | 340/183 |

*Primary Examiner*—Ralph D. Blakeslee
*Attorney*—Conrad O. Gardner

[57] ABSTRACT

Sense line and sense amplifier configurations and circuits for coupling to magnetic memory elements. A sense line comprising a twisted pair of conductors provides coupling along its length to the memory elements. A pair of sense lines may be connected in series or parallel to provide sense signal output pulses of increased amplitude or provide redundancy in the sensing scheme. Further permutations and combinations of the twisted pair sense line provide sense signal output pulses of different amplitude to also provide, e.g., half select pulses. A sense amplifier system utilizes multiplexing techniques to simplify the sense scheme and reduce the amount of circuitry required between the sense lines and the buffer system.

1 Claim, 12 Drawing Figures

Fig. 1.
PRIOR ART
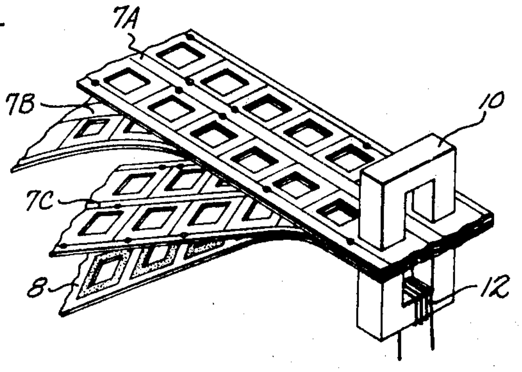
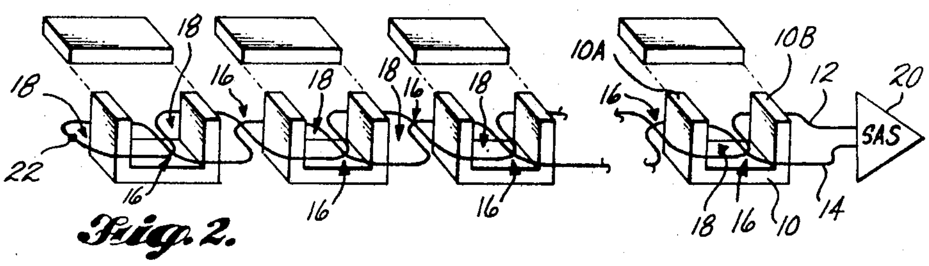
Fig. 2.
Fig. 3.
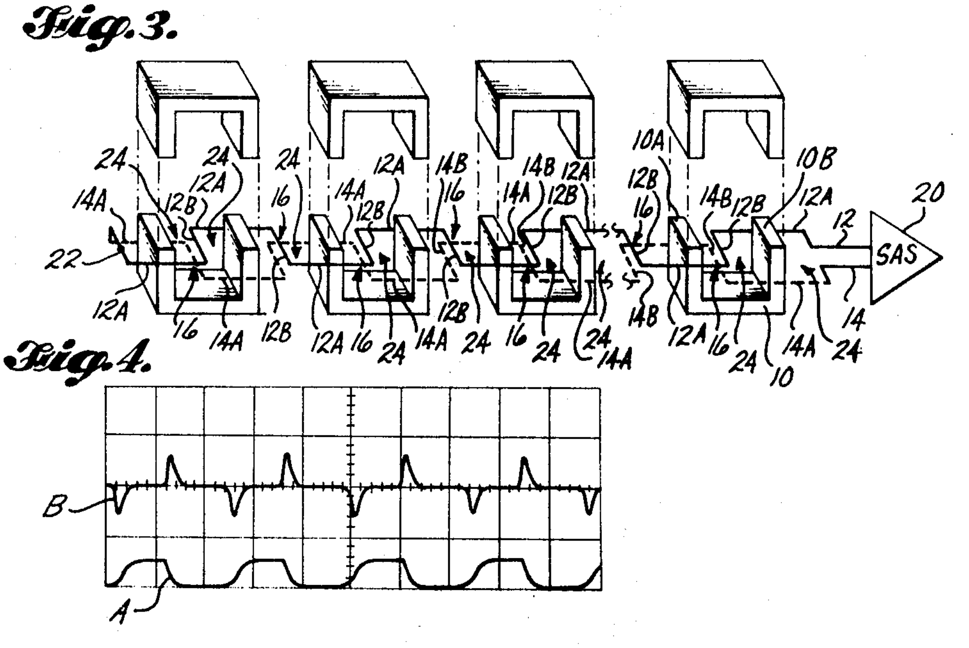
Fig. 3. Fig. 4.

SENSE LINE COUPLING STRUCTURES CIRCUITS FOR MAGNETIC MEMORY DEVICE

This application is a Division of Application Ser. No. 885,227, filed Dec. 15, 1969.

This invention relates to sense lines and sense circuitry coupled thereto for deriving information by flux coupling from magnetic core elements and more particularly to low inductance, low noise sense line structures and sense circuitry utilizing multiplexing circuits for reducing sense amplifier requirements for multiple sense lines.

With the advancement of technology in the field of ferrite core memory the demands for higher speed operation of such memories has resulted in noise voltages which can attain sufficient amplitude that they may mask completely the desired read-out signal therefrom. Various solutions to this important problem of noise reduction have been attempted by others. The sources of noise have been discovered and defined and various schemes other than sense line design have been utilized. Harding, U. S. Pat. No. 3,467,953, shows drive current optimization for reducing noise in sensing circuits. Owen et al., U. S. Pat. No. 3,432,830, shows noise reduction in a read-only storage device of the transformer type by changes in the storage construction other than by any changes to the secondary (sense) windings.

In prior art T.R.O.S. (transformer read-only storage), a plurality of turns is utilized around each I-shaped part of each transformer core (See Owen et al., supra.) to provide the sense (secondary) windings to read out the information in the selected word.

The sense line configurations according to several embodiments of the invention utilize a simple twisted pair or combinations thereof for coupling to an entire row of core elements. Each twisted pair has loops between the overlying cross-over points, the loops occurring in the line along its length surround each core element and provide the necessary coupling to the several core elements in the row with a minimum of self inductance due to the single loop configuration, and a minimum mutual inductance and capacitance to the word lines, the twisted pair feature further providing effective noise cancellation.

A further feature of the invention is the simplified sense amplifier circuitry which utilizes sense signal multiplexing to reduce the number of sense amplifiers required. Previous sense line loops have required connection of low impedance sense amplifiers to each sense line loop, e.g., Bergh et al., U. S. Pat. No. 3,381,279.

It is therefore an object of the present invention to provide unique sense line configurations of low self inductance and having noise cancelling characteristics.

It is a further object of the invention to simplify the sensing scheme and reduce the number of sense amplifiers required for a given number of sense lines.

It is yet another object of the invention to provide multiplexing of sense signals between sense lines and buffer storage.

It is still another object of the present invention to provide open circuit isolation of sense lines during write times to protect the memory stack from spike voltages due to noise produced by the operation of peripheral equipment.

The invention will be more clearly understood from the following description when read in conjunction with the accompanying drawings in which:

FIG. 1 illustrates a transformer read-only storage device according to the prior art;

FIG. 2 shows a twisted pair sense line having curved loops coupled to a number of U/I transformer cores of a transformer read-only storage device in accordance with an embodiment of the invention;

FIG. 3 shows a twisted pair sense line having rectangular loops coupled to a number of U/U transformer cores of a transformer read-only storage device in accordance with a further embodiment of the invention;

FIG. 4 shows output pulses received in response to input drive current pulses plotted along a time scale for a better understanding of the waveshape and sense voltage amplitudes which characterize the sense line configuration shown in FIG. 3;

Figure 5:
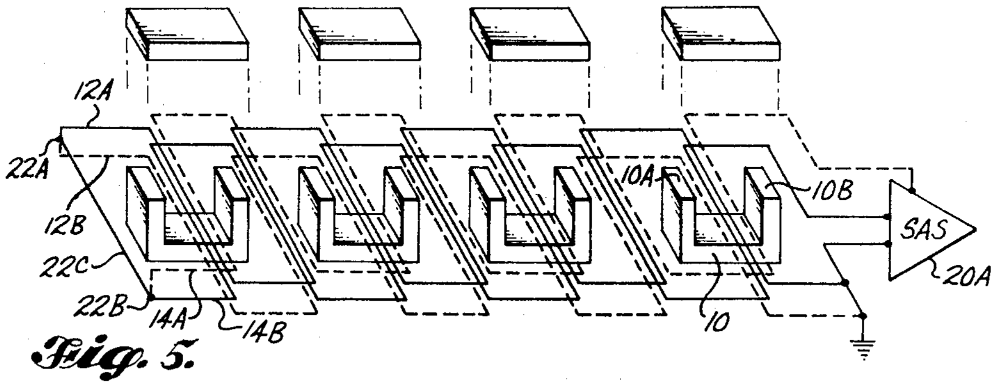
FIG. 5 shows a sense line in a transformer read-only storage device comprising the parallel connection of two sense lines of the type shown in FIG. 3.

Referring now to the drawings, FIG. 1 shows a transformer read-only storage device according to the prior art as exemplified in FIG. 1 of U. S. Pat. No. 3,432,830 to Owen et al. Details of construction of this transformer read-only storage device are not included herein but reference may be made thereto for such teachings which are incorporated herein by reference. Transformer cores 10 include a plurality of data tapes 7A, 7B, and 7C which carry the primary windings which thread or do not thread the linear ferrite cores depending upon the binary bits of information required to make up the data words. A fourth type of tape 8 is shown in FIG. 1 of Owen et al. which is utilized to form resistive loops about the cores and may be used if desired in transformer read-only storage devices according to various embodiments of the present invention; however, this is not required.

The present invention is concerned, however, with sense line configurations and sensing systems coupled thereto. Owen et al. exemplifies the prior art use of multi-turn sense windings 12 which are wound around each individual core (See FIGS. 1 and 2 of Owen et al.). Information is read out by passing a drive current along conductive strips on a selected tape 7A, 7B, or 7C and the selected word is received as a parallel combination of signals and no-signals on all the sense windings wound on all the cores. Such a scheme of sense windings of multiple turns about each core to read out the selected words requires the expense of coil winding machines if done automatically, or tedious handwinding of each core by the production personnel if done by hand. More importantly, the self inductances of the multi-turn loops of the prior art are much greater than the self inductances of the single turn loops of the sense lines according to embodiments of the present invention. Mutual inductance and coupling capacitance is reduced in various embodiments of the present invention by using two twist turn loops, one on each leg of the U-type transformer core. While the various noise sources have been studied and analyzed from worst case standpoints and the exact mutual inductances and coupling capacitances theoretically calculated, the actual performance characteristics as recorded from oscilloscope traces are given in the drawings so that the specific configuration may be easily and readily selected by the user to satisfy particular memory requirements without the need for lengthly theoretical calculations of the several configurations or construction and experimental testing thereof.

Turning now to FIG. 2, it will be seen that a transmission line of the twisted pair type comprising a first conductor 12 and a second conductor 14 is looped over individual magnetic elements comprising a first leg 10A and a second leg 10B of each transformer core 10 between cross-over points 16 at loops 18 formed between spaced-part portions of the first conductor 12 and the second conductor 14 intermediate the cross-over points 16 of first and second conductors 12 and 14, respectively. The sense output signals developed on the twisted pair sense line shown in FIG. 2 may then be coupled as shown to a sense amplifier system (SAS) which may comprise a sense amplifier of the prior art type which has common mode rejection for amplifying the output voltage level in known manner. The twisted pair type transmission line is terminated at the end remote from the SAS by direct connection together of conductors 12 and 14. The twisted pair may be threaded around the core legs by hand. Electromagnetic coupling to memory elements comprising core legs 10A and 10B along the twisted pair transmission line formed by conductor 12 and conductor 14 is thus seen to be provided by locating the memory elements between the conductors 12 and 14 forming the twisted pair in loops 18 distributed along the twisted pair intermediate the cross-over points of conductors 12 and 14 which form the twisted pair. While U/I transformer cores are shown in FIG. 2, U/U cores as shown in FIG. 3 might also be used if desired.

The sense line shown in FIG. 3 differs from that of FIG. 2 in specific loop 24 geometry and arrangement of first conductor 12 and second conductor 14. More specifically, first conductor 12 and second conductor 14 are formed on opposite sides of a tape of the type shown in FIG. 1 and termed 7A. The insulator card or tape is not shown in FIG. 3 so that the specific sense line configuration may more easily be seen however. The insulating substrate, card, or tape may comprise a Mylar sheet with lead 12 formed on the upper surface and lead 14 formed on the lower surface thereof by any one of a number of well-known techniques, as, for example, photoetching or vapor deposition. Each loop 24 is of rectangular shape with opposite side segments 12A and 12B of first conductor 12 and second conductor 14, respectively, along the length of the transmission line being parallel and disposed on opposite sides of consecutive memory elements 10B and 10A positioned along the length of the transmission line. First conductor 12 and second conductor 14 include further segments 12B and 14B, respectively, which are perpendicular to the direction of the transmission line and form the opposite sides of the rectangular loops disposed about the transformer core segments 10A and B of each transformer core 10 along the transmission line. These further segments 12B and 14B intermediate opposite side segments 12A and 12B are superimposed on opposite sides of the insulating substrate or card and are parallel. It will be observed that since conductors 12 and 14 are disposed on opposite sides of a tape, it will be necessary to provide insulation covering these conductors either directly applied by means of a spray such as Krylon,or other means such as a blank tape may be utilized to prevent contact between conductors on different tapes of a book or stack forming the memory.

FIG. 4 shows a graph representative of an oscilloscope trace which was made during tests illustrating the characteristics of switching voltage and output response voltage on a time scale for the single twisting turn sense scheme of FIG. 3. Curve A shows the input drive current of 50 milliamperes on a vertical scale where each division equals 100 milliamperes and along a horizontal time scale where each division represents 500 nanoseconds. Curve B shows switching output voltage where each vertical division of the graph represents 500 millivolts and each time division along the horizontal represents a time of 500 nanoseconds.

A further embodiment of the invention is shown in FIG. 5 where the sensing scheme is comprised of a pair of sense lines of the type described in connection with FIG. 3 however connected in parallel. The first section comprises the twisted pair of conductors 12A and 14A which correspond to conductors 12 and 14 of the transmission line shown in FIG. 3. The second parallel connected section comprises twisted pair conductors 12B and 14B. The first and second sections are parallel connected at the ends 22A and 22B of the transmission line sections remote from sense amplifier 20A by means of conductive lead 22C. A two-stage sense amplifier 20A is shown connected to the four output leads of conductors 12A, 12B, 14A, and 14B.

Figure 6:
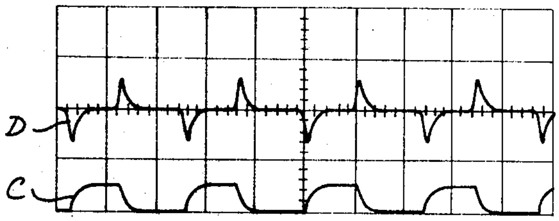
FIG. 6 shows output pulses received in response to input drive current pulses for illustrating the operating principles of the sense line structure illustrated in FIG. 5.

FIG. 6 is representative of the performance characteristics of the parallel connected twisted pairs of FIG. 5 as was observed on a recording oscilloscope. Curve C represents an input drive current of 50 milliamperes while curve D is representative of an observed trace of switching output voltage obtained in response to drive current. In the curve C scale a division on the vertical axis is representative of 100 milliamperes of current, and the units along the horizontal axis represent time intervals of 500 nanoseconds. Vertical units on the scale for curve D represent 500 millivolt signal amplitudes while each division along the horizontal time axis represents an interval of 500 nanoseconds.

Figure 7:
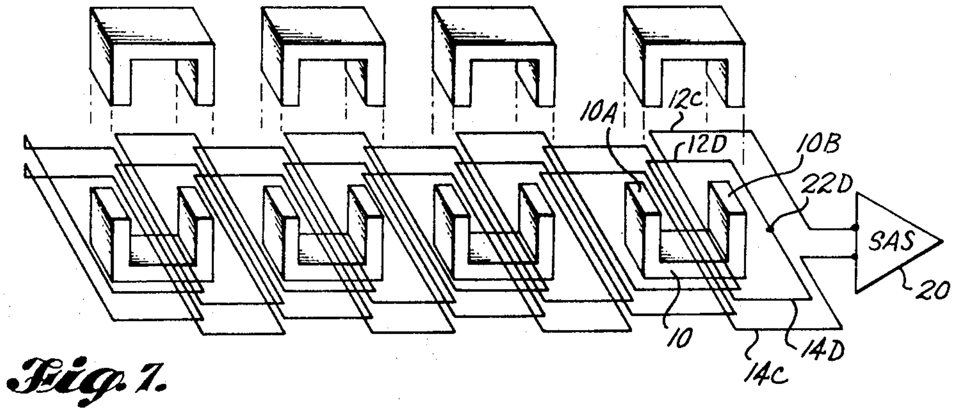
FIG. 7 shows a sense line in a transformer read-only storage device comprising the series connection of two sense lines of the type shown in FIG. 3.
Figure 8:
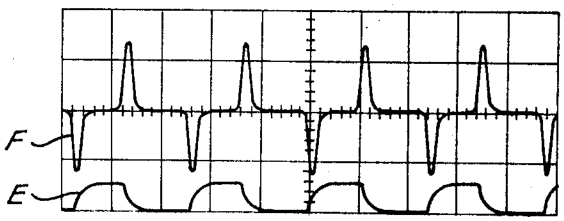
FIG. 8 illustrates the output pulses received in response to drive current pulses for the sense scheme shown in FIG. 7.

In FIG. 7 a first transmission line section comprising twisted pair 12C and 14C is folded back to provide a second transmission line section comprising conductors 12D and 14D which are then brought together at the sense amplifier 20 end in a conductive connection 22D to provide in effect a two-section sense scheme of series-connected twisted pairs of the type shown in FIG. 4. The performance of this sense scheme is illustrated by the graphs of FIG. 8 in which curve E is representative of an applied input drive current of 50 milliamperes, and curve F shows the output voltage pulses derived in response thereto. Each unit along the horizontal represents time intervals of 500 nanoseconds for both curves E and F. Divisions along the vertical scale for input current of curve E represent 100 milliamperes. The vertical scale for curve F is 500 millivolts per division.

Figure 9:
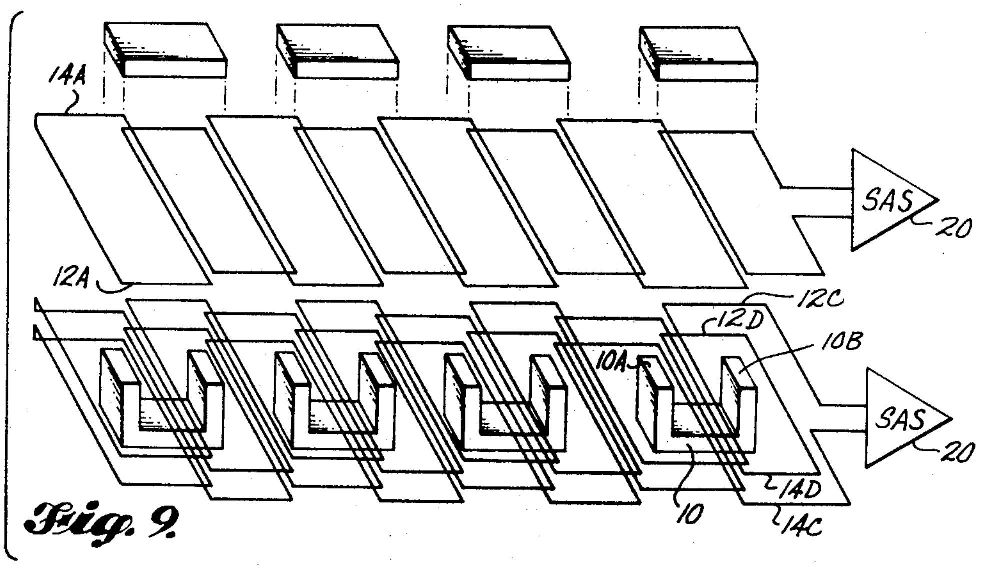
FIG. 9 shows a sense scheme utilizing a sense line of the type shown in FIG. 3 in combination with a sense line of the type shown in FIG. 7 which is capable of producing sense signals of different amplitudes at the outputs of the respective sense lines of the combination.
Figure 10:
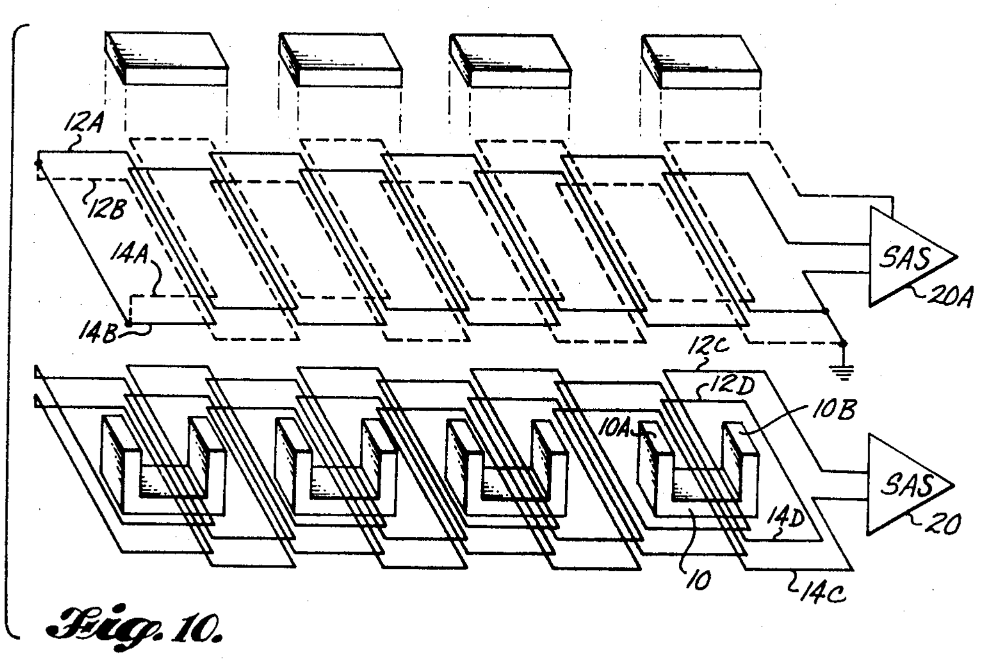
FIG. 10 shows a sensing system utilizing a sense line of the type shown in FIG. 5 in combination with a sense line of the type shown in FIG. 7.

FIGS. 9 and 10 represent combinations of the sense schemes hereinbefore described. While the combinations of FIGS. 9 and 10 are shown with the respective loops of the individual sense scheme sections coupled to corresponding transformer core segments of a read-only memory, once the characteristics of these combinations is recognized, other applications will be appreciated by those skilled in the art. In FIG. 9 it will be recognized that the upper section is a single twisted pair of the type already shown and described in FIG. 3 while the lower section is a pair of series connected twisted pairs of the type shown and described in connection with FIG. 7. In FIG. 10 the upper section of the sense line scheme comprises the parallel connection of twisted pairs of the type already described in connection with FIG. 5, while the lower section as seen in FIG. 5 will be recognized as a pair of the series connected twisted pair of the type shown and discussed previously in FIG. 7. When the graphs of the respective sections making up the combinations of FIG. 9 and 10 are studied, it will be appreciated that in the systems of FIGS. 9 and 10 a pair of sense signals are derived in each case which are of different levels from each of the individual core segments or magnetic memory elements to which the individual loops of the corresponding sections are respectively coupled. The transmission line systems of FIGS. 9 and 10 providing different degrees of electromagnetic coupling levels for the same (as disclosed herein in the specific embodiments described) and/or selected groups or combinations of core elements by the different sections may be appreciated by the designer and utilized in different variations in connection with the solution of noise problems and other problems in the design of other memories such as, e.g., coincident current memories where half select pulses are required to be distinguished from half select noise pulses. The different output signal level signals can be utilized as by comparison to distinguish over noise output signals which may mask the desired read-out signals.

Comparing briefly now the threee types of sense systems shown in FIGS. 3, 5, and 7, it will be seen from observations of the respective graphs that the series connected pair of FIG. 7 is superior to the systems of FIGS. 3 and 5 where a lower level drive current is preferred for a given output voltage. The output voltage of the FIG. 7 series arrangement is almost twice the output voltage of either the single twisted pair transmission line of FIG. 3 or the parallel connected twisted pair of FIG. 5. For example, from FIGS. 8, 4 and 6, the output voltage is 700 millivolts for the series arrangement as compared to 350 millivolts and 350 millivolts, respectively, for the single twisted pair or parallel twisted pair under constant drive current amplitude. The switching time in any of the above three types of sense schemes remains constant at 80 nanoseconds with rectangular drive current in any case. The single twisted pair of FIG. 3 is the simplest from a structural design standpoint since capable of being printed on a single tape but does not provide the redundancy inherent in the parallel connected twisted pair although the output of the parallel connected pair is slightly higher for a given drive current.

Figure 11:
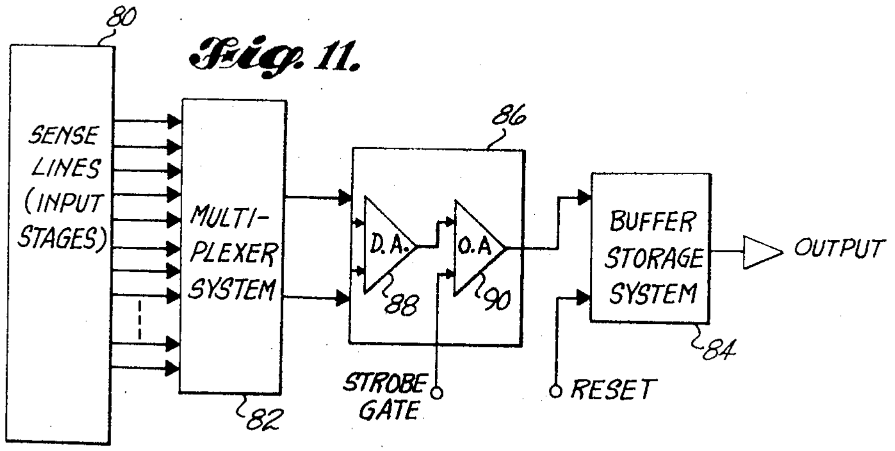
FIG. 11 is a schematic block and line diagram of a system for coupling a plurality of sense lines to a single sense amplifier utilizing multiplexing techniques to provide information to buffer storage for ultimate transmission to a utilization device.
Figure 12:
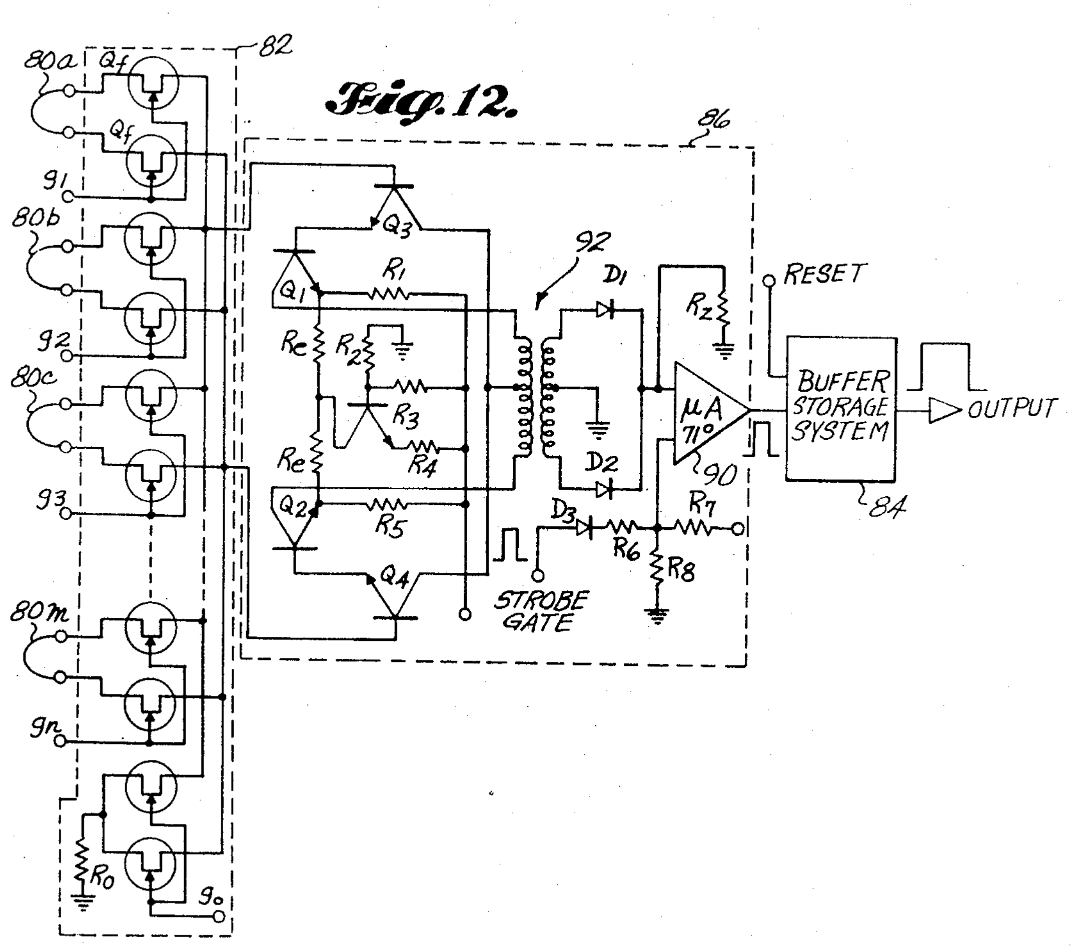
FIG. 12 is a schematic diagram showing a circuit embodiment of the system shown in FIG. 11.

A sensing system which may be coupled to sense lines of a read-only memory stack of the types previously described is shown in FIG. 11 with the complete electrical circuit schematic of one embodiment of this system shown in FIG. 12. In FIG. 11 the sense lines 50,which may be of the twisted pair type hereinbefore described, are brought out from the memory stack and coupled to a multiplexer system 82 which simplifies the sense scheme from sense lines 80 to buffer storage system 84 by reducing the number of sense amplifiers 86 required. The multiplexer system 82 consists of pairs of MOS FET or Junction FET transistors coupled to the sense line output leads as will be seen in more detail in the schematic diagram of FIG. 12. The sense amplifier 86 includes a differential preamplifier stage 88 coupled from the multiplexer system to an operational amplifier 90 which may be a $\mu$ A type 710. The sensing system of FIG. 11 may be utilized in core memory or thin film memory systems with slight modification as pointed out in the following explanation of the specific circuit embodiment of FIG. 12.

Turning now to FIG. 12, it will be observed that the first stage of the system consists of MOS FET pairs of the multiplexer system 82 (a pair coupled to the output leads of each sense line 80*a*, 80*b*, 80*n*), the second stage consists of a predifferential amplifier coupled to a main amplifier and the last stage consists of a buffer system to simplify the operations of the peripheral equipment. During the reading time of the memory cycle, the MOS FET switching of one pair is turned on, and the information in the corresponding sense line will be accepted. During writing time, all the MOS FET switches are opened, and the memory stack will be completely protected from the spike voltages which are the noise inherently produced from the operation of the peripheral equiment and circuitry. During non-reading time, the additional MOS FET of one pair called the "dummy switching" is turned on at $g_o$ and floating signals are thereby effectively eliminated.

It should be noted that the pulse width (reading cycle) of sense output is proportional to the width of the strobe pulse, and the magnitude of sense output is proportional to the magnitude of strobe voltage. The main advantage of the strobe feature of the system lies simply in controlling memory cycle time and in synchronization with other subsystems including memory address and memory register. It can thus be seen that the multiplexing system can reduce not only the number of sense amplifiers that would be required for a given number of sense lines but also satisfies system requirements.

The above-mentioned predifferential amplifier 88 of the second stage includes a pulse transfomer 92 to provide desired common mode rejection and bipolar to unipolar signal conversion. If the memory stack consists of ferrite cores, then the differential amplifier 88 in the primary of pulse transformer 92 may comprise the single stage of sense amplifier 86 whereas if the memory stack contains thin film magnetic elements, then the differential amplifier may comprise two stages. In FIG. 12, $g_1$, $g_2$ and $g_n$ are drive gates and $g_o$ is the previously mentioned "dummy gate." $Q_f$ is an FET.

Also specific circuit values are:

$R_1 = R_5 = 10K$ ohms, $R_2 = 4.7K$ ohms, $R_3 = 560$ ohms, $R_4 = 47$ ohms.

$R_2$ is selected by the desired gain.

$R_3$ denotes load impedance.

While certain embodiments of the described twisted pair type transmission lines have been used for purposes of illustration, it should be recognized that the coupling structures and systems of the present invention are applicable with variations thereof for use in various types of memory devices as will become apparent to those skilled in the art, and such embodiments in other applications are not to be understood to depart from the spirit and scope of the invention as defined by the appended claims.

What is claimed is:

1. A system for processing sense winding output pulses from a plurality of sets of closed loop sense lines comprising in combination:

multiplexing means coupled to said plurality of sets of closed loop sense lines;

sense amplifier means coupled to the output of said multiplexing means for amplifying sense output pulses from any one of said closed loop sense lines;

buffer storage means for transmitting said amplified sense output pulses to utilization means;

said sense amplifier means comprising;

a first differential amplifier stage;

a transformer having a primary and a secondary winding;

an operational amplifier stage;

said secondary winding having a center tap coupled to reference potential;

said secondary winding being coupled to an input of said operational amplifier; and means for coupling strobe pulse generating means to the other input of said operational amplifier.

* * * * *